(12) United States Patent
Rowell

(10) Patent No.: US 6,929,578 B1
(45) Date of Patent: Aug. 16, 2005

(54) PLANETARY GEAR CARRIER ASSEMBLY

(75) Inventor: Brian G. Rowell, Saxtons River, VT (US)

(73) Assignee: Sonnax Industries, Inc., Bellows Falls, VT (US)

( * ) Notice: Subject to any disclaimer, the term of this patent is extended or adjusted under 35 U.S.C. 154(b) by 0 days.

(21) Appl. No.: 10/602,505

(22) Filed: Jun. 24, 2003

Related U.S. Application Data

(60) Provisional application No. 60/393,901, filed on Jul. 8, 2002.

(51) Int. Cl.[7] ............................................. F16H 57/08
(52) U.S. Cl. ................................................... 475/331
(58) Field of Search .................................. 475/348, 331; 384/617, 620; 29/401.1, 898.01, 888.011, 29/888.012, 893.1, 898.07

(56) References Cited

U.S. PATENT DOCUMENTS

| | | | | |
|---|---|---|---|---|
| 3,747,196 A | * | 7/1973 | Whittington | 29/898.01 |
| 3,842,481 A | * | 10/1974 | Laing | 29/893.1 |
| 4,617,711 A | * | 10/1986 | McMinn | 29/402.08 |
| 4,968,157 A | * | 11/1990 | Chiba | 384/620 |
| 5,545,104 A | * | 8/1996 | Tilley | 475/331 |
| 5,658,214 A | * | 8/1997 | Hofstetter et al. | 475/346 |
| 5,897,453 A | * | 4/1999 | Mimura | 475/246 |
| 6,675,453 B2 | * | 1/2004 | Briggs | 29/401.1 |
| 6,719,662 B2 | * | 4/2004 | Forrest et al. | 475/231 |

* cited by examiner

*Primary Examiner*—Roger Pang
(74) *Attorney, Agent, or Firm*—Clifford F. Rey

(57) ABSTRACT

A planetary gear carrier assembly having an upgraded thrust bearing with an increased surface contact area and corresponding dynamic load rating capable of withstanding the axial thrust forces generated by engagement of the planetary gears in a General Motors 4L60, 4L60E or other similar transmission. The present carrier assembly includes an upgraded radial roller bearing having an increased number of roller elements of a greater axial length than the original equipment manufacture. The upgraded thrust bearing is accommodated by machining semicircular cutouts of a predetermined dimension and axial length coextensive with the inner surface of a central opening in the carrier housing, which is the only access for installation of the thrust bearing. The larger diameter bearing is installed within the carrier housing by passing it through the central opening in alignment with the semicircular cutouts after assembly of the carrier housing is complete.

14 Claims, 7 Drawing Sheets

PLANETARY GEAR CARRIER ASSEMBLY

CROSS-REFERENCE TO RELATED APPLICATION

This application claims the benefit under 35 U.S.C. § 119(e) of U.S. Provisional Patent Application No. 60/393,901 to Brian G. Rowell filed Jul. 8, 2002, entitled Planetary Carrier Assembly.

BACKGROUND OF INVENTION

The present invention relates to automatic transmissions and, more particularly, to improvements in a planetary carrier assembly for General Motors 4L60, 4L60E (hereinafter "GM transmissions") and other similar transmissions.

Planetary gears are so-named because of their physical arrangement. That is, a planetary gear set consists of a so-called sun gear positioned within an internal ring gear and a planetary carrier assembly, which contains and supports the smaller planet gears called pinions. Planetary gear sets are used in the GM transmissions as the basic means of transferring the torque and power of the engine to the drive wheels. The planetary gear set allows speed and directional changes in the automatic transmission without disconnecting the engine from the drive wheels with a clutch, as with a manual transmission. The GM transmissions include two planetary gear sets, namely, the input and rear reaction gear sets, which are provided in both four and five pinion gear configurations.

The planetary gears are designed so that several gear teeth are always in mesh at once. This design distributes the mechanical forces over several gear teeth for added strength and prevents any damage associated with gears going in and out of mesh. The planetary gears include helical teeth, which impart axial thrust to the sun gear upon shifting into different gear ranges. Accordingly, in the planet carrier assembly a thrust bearing such as a Torrington radial roller bearing is employed to distribute this axial thrust force.

However, in the original equipment manufacture (hereinafter "OEM") planet carrier, the maximum size and corresponding load rating of the thrust bearing is limited by the physical diameter of the central opening in the carrier, which provides the only access for installation of the thrust bearing. As a result the OEM thrust bearing has a high failure rate, which causes shifting malfunctions and can result in catastrophic failure of related components. Thus, the present invention has been developed to resolve this problem and other shortcomings of the prior art.

SUMMARY OF THE INVENTION

Accordingly, the present invention provides a planet carrier assembly having a thrust bearing with an increased surface contact area and corresponding dynamic load rating, which is capable of withstanding the axial thrust forces generated by engagement of the planetary gears in a General Motors 4L60, 4L60E or other similar transmission. In the present carrier assembly the upgraded thrust bearing is installed by machining diametrically opposed semicircular cutouts of a predetermined dimension and axial length coextensive with the central opening of the planet carrier housing, which permits the larger thrust bearing to be inserted into the planet carrier housing via the central opening in alignment with the semicircular cutouts after assembly of the planetary carrier housing is complete.

There has thus been outlined, rather broadly, the important features of the invention in order that the detailed description thereof that follows may be better understood, and in order that the present contribution to the art may be better appreciated. There are additional features of the invention that will be described hereinafter and which will form the subject matter of the claims appended hereto.

BRIEF DESCRIPTION OF THE DRAWINGS

The novel features of the present invention are set forth in the appended claims. The invention itself, however, as well as other features and advantages thereof will be best understood by reference to the following detailed description of an illustrative embodiment when read in conjunction with the accompanying figures, wherein:

DETAILED DESCRIPTION OF THE PREFERRED EMBODIMENTS

Figure 1:
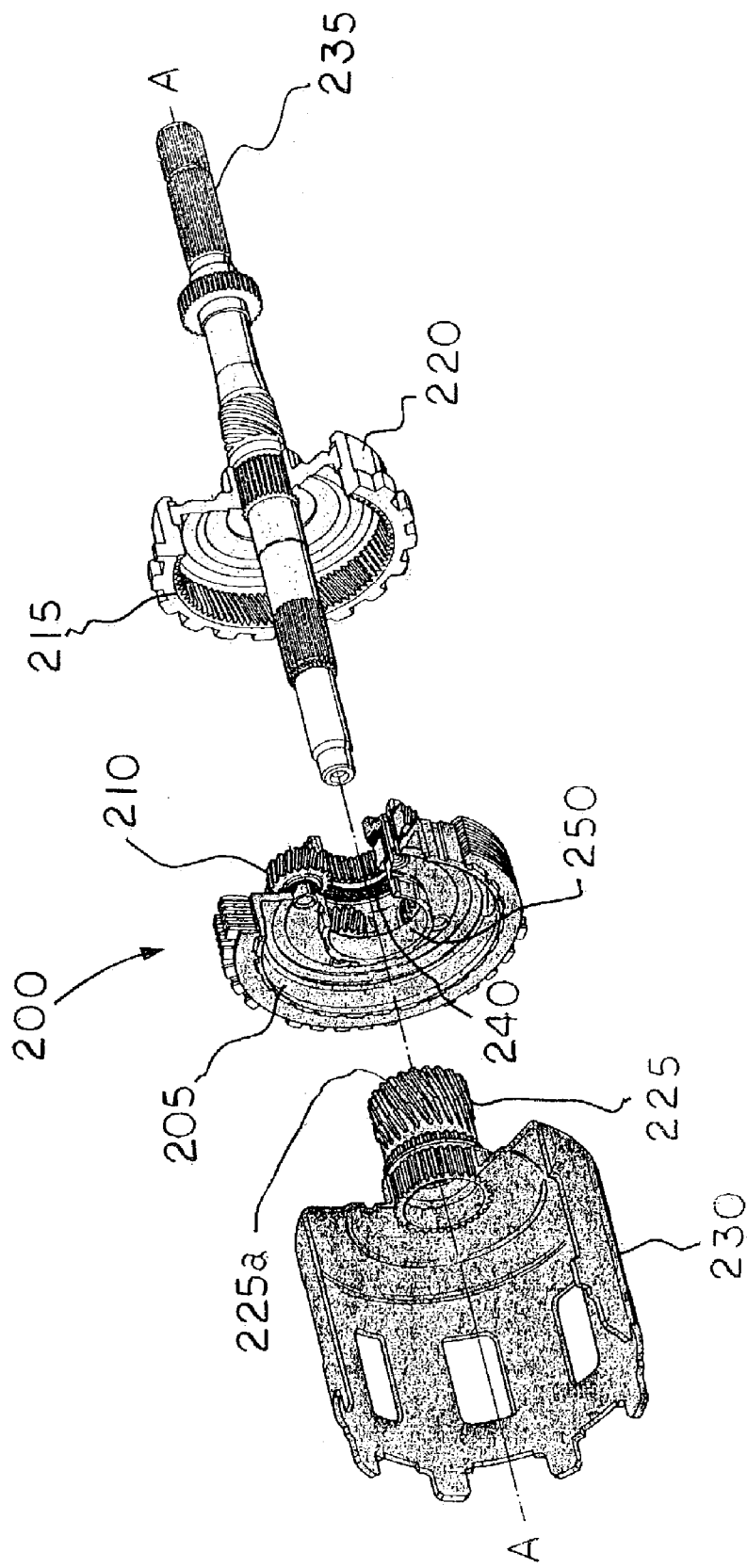
FIG. 1 is an exploded perspective view of the OEM planet carrier within the planetary gear set labeled Prior Art.

Prior to discussing the present invention in detail, it may be beneficial to briefly review the structure and function of a planetary gear set. With further reference to the drawings there is shown therein an OEM rear reaction planetary carrier assembly-for the GM transmissions, indicated generally at 200 and illustrated in FIG. 1. The rear reaction carrier assembly 200 is comprised of a housing 205 defining an interior space 175 (FIG. 4) wherein a plurality of planet pinion gears 210 are rotatably mounted in concentric relation to the longitudinal axis -A-. In this arrangement the planet gears 210 are disposed in evenly spaced relation between the internal ring gear 215 formed in the adjacent gear support housing 220 and the sun gear 225 mounted on the sun gear shell 230. Such arrangement may include four or five planet gears 210 depending on the model year of the vehicle. The sun gear 225, planetary carrier 200, and the gear support housing 220 engage mating splines on the transmission output shaft 235.

Such a planetary gear set can be used to increase torque, increase speed, reverse the direction of rotation, or function as a coupling for the direct drive gear range by holding or, alternatively, driving the individual members of the gear set.

Thus, if the ring gear 215 is held and the sun gear 225 is rotated, the pinion gears 210 will "walk" around the sun gear and rotate the planet carrier 200 in the same direction as the sun gear, but at a much slower speed providing a major gear reduction. If the sun gear 225 is held and the ring gear 215 is rotated, the pinion gears 210 will "walk" around the sun gear 225 at a somewhat slower speed than the ring gear providing a minor gear reduction. By holding the planet carrier 200 and driving the sun gear 225, the ring gear 215 is turned in the opposite direction to provide reverse gear. Direct drive can be achieved by locking any two elements of the planetary gear set together.

Figure 2A:
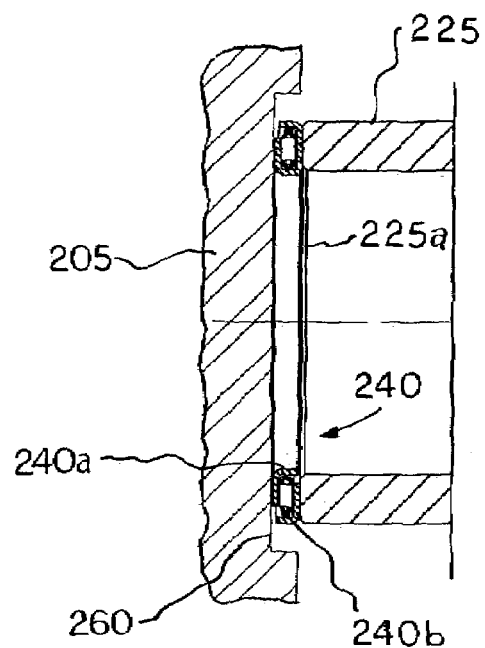
FIG. 2A is a cross-sectional view of a prior art thrust bearing assembly disposed intermediate the sun gear component and the housing of the planetary gear set.

The axial thrust of the sun gear 225 during operation requires the deployment of a thrust bearing, indicated generally at 240, between the aft end face 225a of the sun gear 225 and a counterbored bearing seat 260 formed within the housing 205 as more clearly shown in FIG. 2A. A thrust bearing 240 such as a Torrington® radial roller bearing having a plurality of radially disposed roller elements or rollers 245 is commonly utilized to distribute the axial load in this application. It will be understood that the thrust bearing 240 is piloted by (i.e. locates on the outside diameter) of the shaft 235 (FIG. 1).

Such thrust bearings 240 are manufactured to industry specifications and carry a dynamic load rating used in load-life calculations, which typically increases with the nominal outside diameter of the thrust bearing.

During the manufacture of the OEM planet carrier assembly 200, the installation of the thrust bearing 240 is one of the last steps in the assembly process of the housing 205 due to the cleanliness requirements of such a bearing. In an assembly process for the OEM planet carrier, the mating sections of the housing 205 are joined by weldment. Thereafter, the bearing 240 and pinion gears 210 each with their respective roller bearings and shafts (not shown) are installed in the housing 205.

It will be understood by those skilled in the art that the thrust bearing 240 must be inserted through the opening 250 in the housing 205 to complete the assembly. Thus, the maximum outside diameter (O.D.) of the thrust bearing 240 and the corresponding maximum load rating of the bearing is effectively limited by the size (i.e. inside diameter) of the opening 250 (FIG. 1) through which the bearing 240 must be inserted during assembly.

As a result it is common for the GM transmissions to have chronic service complaints due to overloading and eventual failure of the thrust bearing 240, which has an inadequate load rating for this application. Accordingly, the present invention has been developed to resolve this problem and will now be described.

Figure 2B:
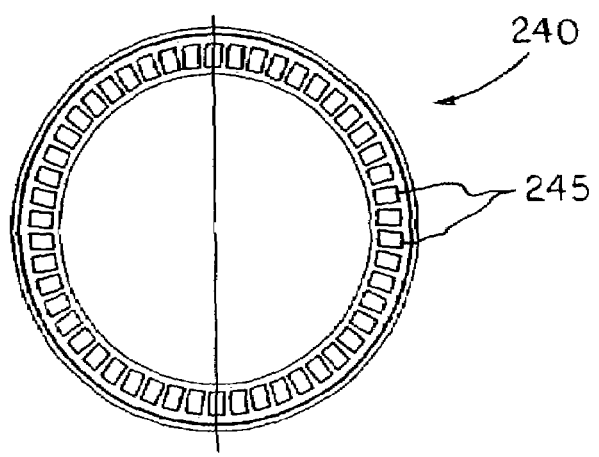
FIG. 2B is a plan view of the thrust bearing of FIG. 2A in a partially disassembled condition showing the orientation of the roller elements.
Figure 3A:
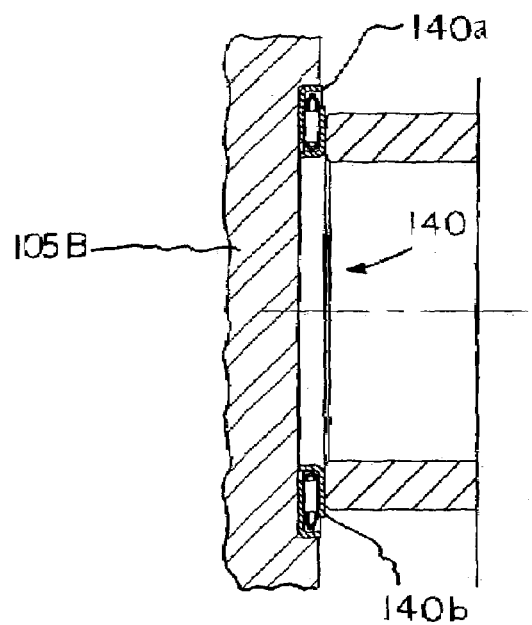
FIG. 3A is a cross-sectional view of the present thrust bearing assembly residing in a mating counterbore formed in the housing of the planetary gear set.
Figure 3B:
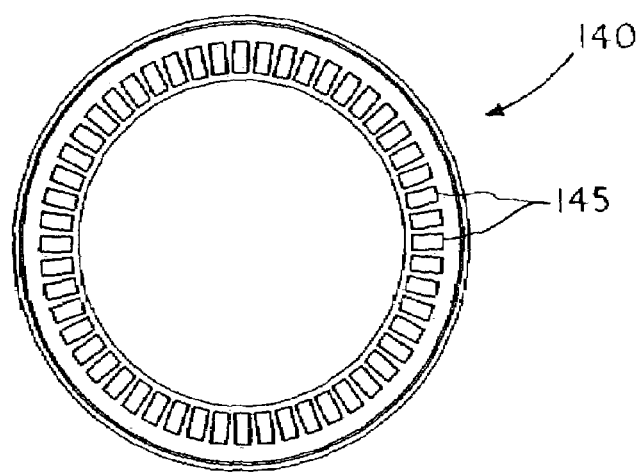
FIG. 3B is a plan view of the thrust bearing of the present invention being partially disassembled and showing the orientation of the roller elements.

Referring to FIG. 3 the present planetary carrier assembly includes a radial roller thrust bearing, indicated generally at 140, such as a Torrington® bearing, which provides a 30% increase in the contact surface of the bearing 140 and a corresponding increase in dynamic load rating in comparison to the OEM design. This upgrade is achieved by employing a thrust bearing 140 including an increased number of rollers 145 each having a greater axial length than the OEM rollers 245 (FIG. 2B) resulting in a thrust bearing 140 with a larger outside diameter and contact surface area. More particularly, in the present thrust bearing 140 the number of rollers 145 has been increased from 50 to 52 rollers per bearing with the axial length of each roller 145 being increased from 0.1110 to 0.157 inches to provide the increase in bearing contact surface.

Figure 5A:
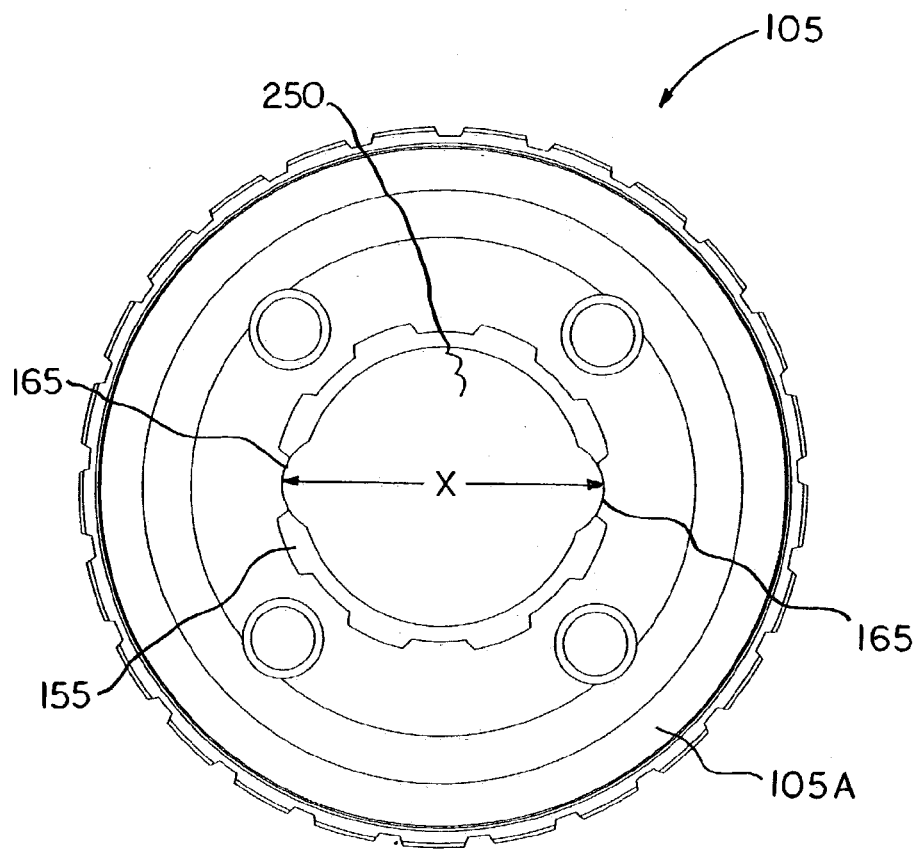
FIG. 5A is a right end view of the planetary carrier of FIG. 4 showing the orientation of the opposed semicircular cutouts.

The installation of the upgraded thrust bearing 140 is accomplished by machining at least one semicircular cutout 165 into the inside diameter surface of the opening 250 in the center hub 155 of a first mating section 105A of the planet carrier. In the embodiment shown in FIG. 5A, a pair of diametrically opposed, semicircular cutouts 165 are machined coextensively with the opening 250 to a predetermined radial depth and corresponding to dimension "X" in FIG. 5. This machining operation is performed during the manufacturing process and prior to assembly of the present carrier housing 105. This permits the installation of thrust bearing 140 having an outside diameter slightly less than the dimension "X", but significantly larger than the OEM bearing 240 to be utilized.

Figure 5B:
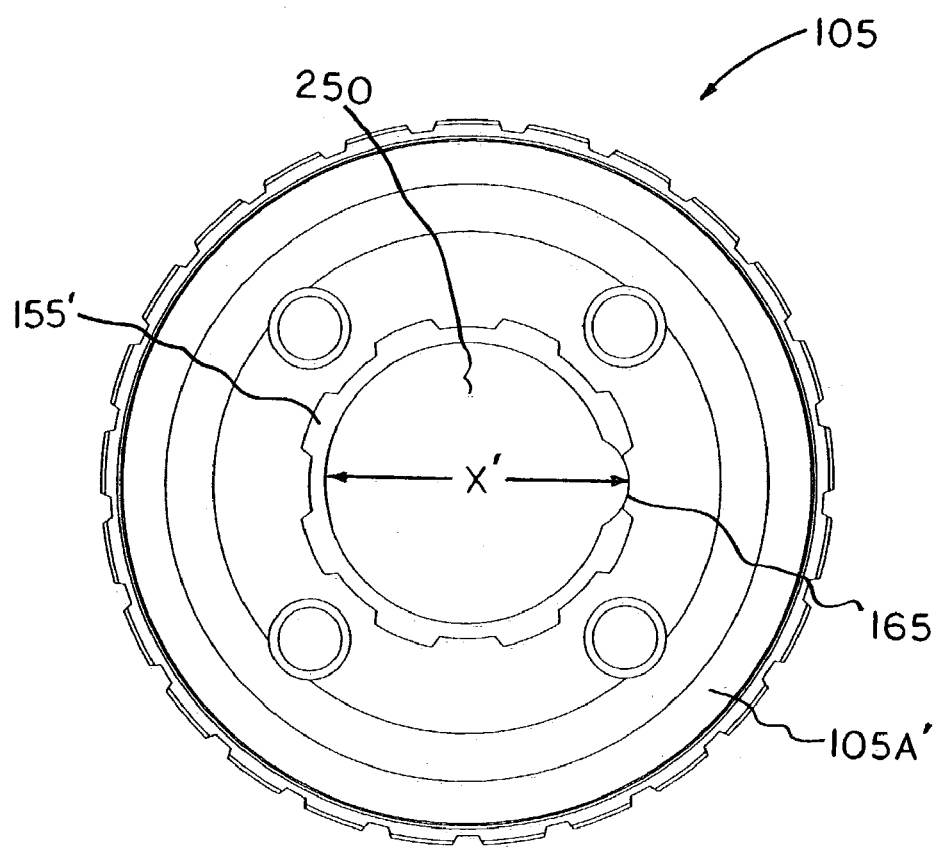
FIG. 5B is a right end view of an alternative embodiment of the planetary carrier including a single semicircular cutout.

In an alternative construction a single semicircular cutout 165 is machined into the inside diameter surface of the opening 250 in the center hub 155' of a first mating section 105A' of the carrier housing as shown in FIG. 5B. This permits the installation of a thrust bearing 140 having an outside diameter slightly less than the dimension "X'", but larger than the OEM bearing 240 to be utilized.

In an assembly method of the present invention, thrust bearing 140 is inserted into the interior space 175 (FIG. 4) within the housing 105 via the opening 250 in alignment with semicircular cutouts 165 (FIG. 5) and then seated in counterbore 160 (FIG. 6) after assembly of the carrier housing sections 105A, 105A' and 105B is complete.

Figure 4:
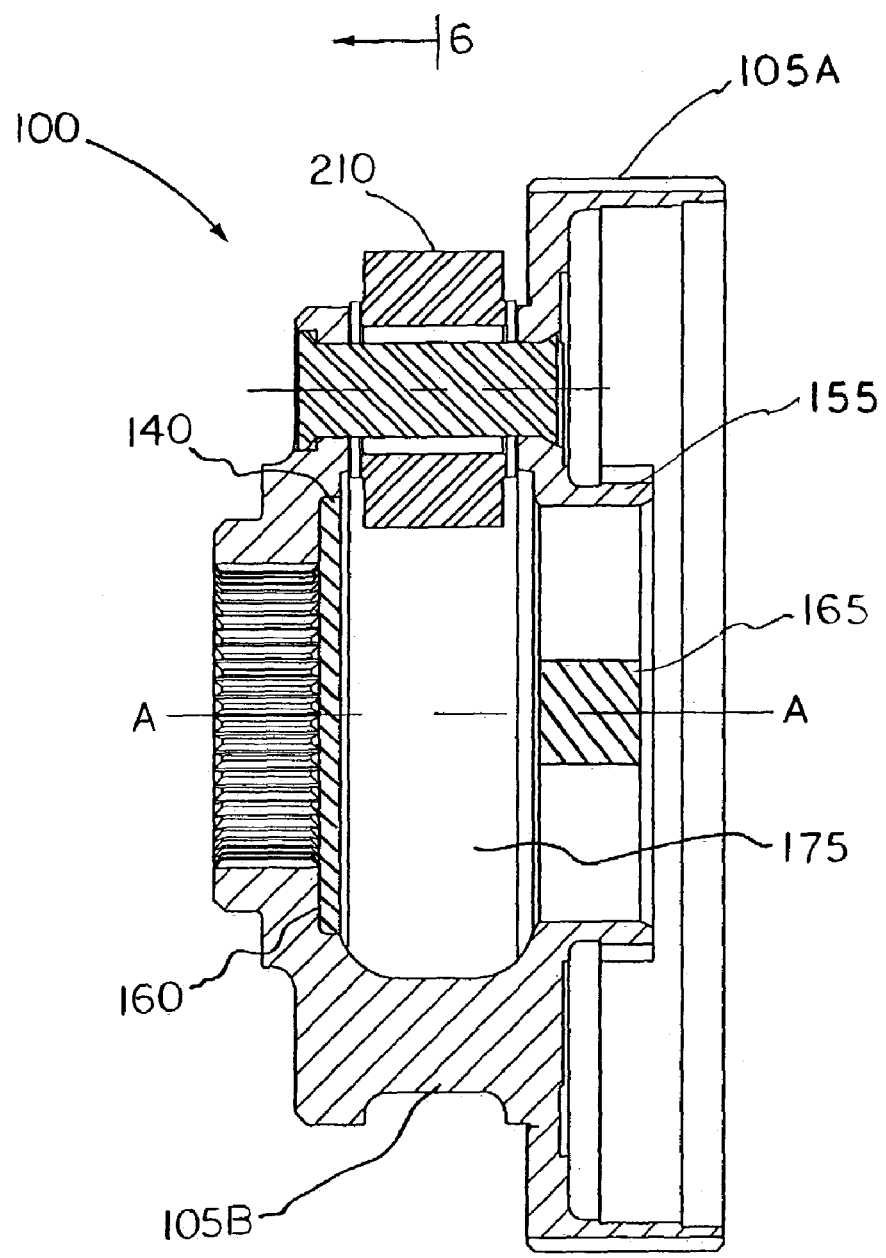
FIG. 4 is a cross-sectional view of the planetary carrier assembly of the present invention.
Figure 6:
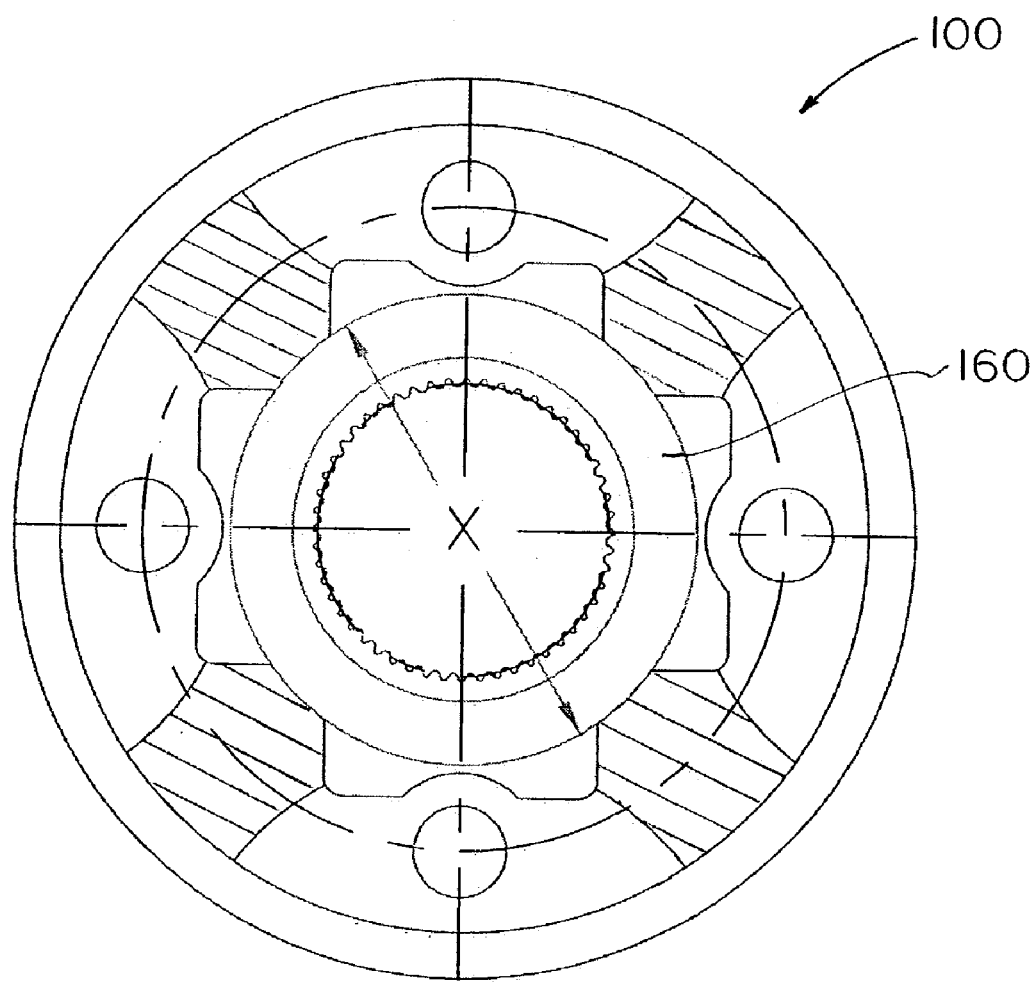
FIG. 6 is a cross-sectional view taken along section line 6—6 of FIG. 4 showing the enlarged counterbore feature wherein the present thrust bearing is seated.

Referring to FIG. 6 the mating counterbore 160 wherein the thrust bearing 140 is seated prior to final assembly is machined on an inside surface of the housing section 105B in concentric relation to the -A- axis (FIG. 4). The counterbore 160 has an inside diameter corresponding to the dimension "X" to receive the bearing 140 therein. Thus, the present thrust bearing 140 is piloted by the counterbore 160 to maintain concentricity during operation in contrast to being piloted by the shaft 235 (FIG. 1). It will also be appreciated by those skilled in the art that the orientation of the bearing races 140a, 140b of the bearing assembly 140 (FIG. 3A) have been reversed in comparison to the OEM races 240a, 240b of the bearing 240 (FIG. 2A), which is designed to retain ATF thereby improving lubrication of the rollers 145.

Thus, it can be seen that the present invention provides a planetary carrier gear assembly having a thrust bearing assembly with a higher dynamic load rating than the OEM design that is capable of withstanding the axial thrust forces generated by engagement of the planetary gear set in the GM transmissions. The installation of the higher-rated thrust bearing is accomplished by machining at least one semicircular cutout of a predetermined dimension and axial length into the central opening of the carrier housing. The semicircular cutouts permit the physically larger bearing to be inserted into the interior space of the carrier housing via the semicircular cutouts after assembly of the carrier housing is complete.

Although not specifically illustrated in the drawings, it should be understood that additional equipment and structural components will be provided as necessary and that all of the components described above are arranged and supported in an appropriate fashion to form a complete and operative Planet Carrier Assembly incorporating features of the present invention.

Moreover, although illustrative embodiments of the invention have been described, a latitude of modification, change, and substitution is intended in the foregoing disclosure, and in certain instances some features of the invention will be employed without a corresponding use of other features.

Those skilled in the art will appreciate that the conception upon which this disclosure is based may readily be utilized as a basis for the designing of other structures, methods, and systems for carrying out the purposes of the present invention. It is important, therefore, that the claims be regarded as including such equivalent constructions insofar as they do not depart from the spirit of the present invention.

What is claimed is:

1. A planetary gear carrier assembly for an automatic transmission of a land vehicle, said carrier assembly comprising:
   a carrier housing including a first mating section and a second mating section, said first mating section including a central access opening having an inside diameter of a predetermined dimension, said first mating section further including at least one semicircular cutout formed coextensively with an inner surface of said access opening;
   a set of planetary gears rotatably mounted in coplanar relation within said carrier housing and intermediate said first and said second mating sections; and
   a replacement thrust bearing residing at a location within said carrier housing accessible only through said access opening, said replacement thrust bearing having an outside diameter greater than said inside diameter of said access opening and less than a linear dimension measured between said inside diameter and said cutout permitting said replacement thrust bearing to pass through said opening in alignment with said cutout after assembly of said carrier housing.

2. The planetary gear carrier assembly of claim 1 wherein said thrust bearing is a radial roller bearing having at least fifty-two roller elements.

3. The planetary gear carrier assembly of claim 2 wherein said roller elements measure at least 0.157 inches in comparison to an original equipment thrust bearing having roller elements measuring 0.110 inches providing a corresponding increase in dynamic load rating.

4. The planetary gear carrier assembly of claim 1 wherein said replacement thrust bearing is piloted by a counterbore formed within an interior surface of said second mating section of said carrier housing.

5. A planetary gear carrier assembly for an automatic transmission of a land vehicle, said carrier assembly comprising:
   a planetary carrier housing including a first mating section and a second mating section, said first mating section including a central access opening having an inside diameter of a predetermined dimension, said first mating section further including a pair of opposed semicircular cutouts formed coextensively with an inner surface of said access opening;
   a set of planet gears rotatably mounted in coplanar relation within said carrier housing and intermediate said first and said second mating sections; and
   a replacement thrust bearing residing at a location within said carrier housing accessible only through said access opening, said replacement thrust bearing having an outside diameter greater than said inside diameter of said access opening and less than a linear dimension measured between said semicircular cutouts permitting said replacement thrust bearing to pass through said opening in alignment with said cutouts after assembly of said carrier housing.

6. The planetary gear carrier assembly of claim 5 wherein said replacement thrust bearing is a radial roller bearing having at least fifty-two roller elements.

7. The planetary gear carrier assembly of claim 6 wherein said roller elements measure at least 0.157 inches in comparison to an original equipment thrust bearing having roller elements measuring 0.110 inches providing a corresponding increase in dynamic load rating.

8. The planetary gear carrier assembly of claim 5 wherein said thrust bearing is piloted by a counterbore formed within an interior surface of said second mating section of said carrier housing.

9. An improved planet carrier assembly of the type having a carrier housing including a first mating section and a second mating section, said first mating section including an access opening of a predetermined dimension, a set of planet gears rotatably mounted in coplanar relation within said carrier housing and intermediate said first and said second mating sections, and an original equipment thrust bearing for installation within said housing, wherein said bearing is installed through said access opening, the improvements comprising:
   a modified carrier housing wherein said first mating section includes a pair of diametrically opposed semicircular cutouts formed coextensively with said access opening; and
   a replacement thrust bearing having an increased surface contact area and dynamic load rating in comparison to the original equipment thrust bearing, said replacement thrust bearing having an outside diameter greater than said access opening and less than a linear dimension measured between said semicircular cutouts thereby permitting said replacement thrust bearing to pass through said opening in alignment with said cutouts after assembly of said carrier housing.

10. The planetary gear carrier assembly of claim 9 wherein said replacement thrust bearing is a radial roller bearing having at least fifty-two roller elements.

11. The planetary gear carrier assembly of claim 10 wherein said roller elements measure at least 0.157 inches in comparison to the original equipment thrust bearing having roller elements measuring 0.110 inches providing a corresponding increase in dynamic load rating.

12. The planetary gear carrier assembly of claim 9 wherein said replacement thrust bearing is piloted by a counterbore formed within an interior surface of said second mating section of said carrier housing.

13. A method of manufacturing a planetary gear carrier assembly having a plurality of planet gears installed therein for use in an automatic transmission, said method comprising the steps of:
   providing a first mating section of a planetary carrier housing including an access opening and a second mating section of said carrier housing;
   machining diametrically opposed semicircular cutouts within an inside diameter of said access opening such that a linear dimension measured between said semicircular cutouts is greater than said inside diameter;
   capturing said planet gears intermediate said first mating section and said second mating section in rotatable engagement therein;
   joining said mating sections to assemble said planetary carrier housing; and
   inserting a thrust bearing having an outside diameter larger than said inside diameter of said access opening and less than said linear dimension into said housing via said semicircular cutouts.

14. The method of claim 13 wherein the step of joining is carried out by weldment of said first and second mating sections.

* * * * *